(12) United States Patent
Greuter et al.

(10) Patent No.: US 6,678,139 B1
(45) Date of Patent: Jan. 13, 2004

(54) HIGH VOLTAGE LEAD-THROUGH

(75) Inventors: Felix Greuter, Rütihof (CH); Thomas Christen, Birmenstorf (CH); Petra Kluge-Weiss, Dättwil (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 10/009,449
(22) PCT Filed: Jun. 13, 2000
(86) PCT No.: PCT/CH00/00320
§ 371 (c)(1),
(2), (4) Date: Apr. 8, 2002
(87) PCT Pub. No.: WO00/77904
PCT Pub. Date: Dec. 21, 2000

(30) Foreign Application Priority Data

Jun. 14, 1999 (DE) .......................... 199 26 950

(51) Int. Cl.$^7$ ................................................ H02H 1/00
(52) U.S. Cl. ............................................ 361/117
(58) Field of Search ................ 361/117, 118, 361/127, 126, 35–39, 131.132

(56) References Cited

U.S. PATENT DOCUMENTS

| 4,700,258 A | * 10/1987 | Farmer | 361/39 |
| 5,210,676 A | * 5/1993 | Mashikian | 361/117 |
| 5,517,382 A | 5/1996 | Leupp et al. | |
| 5,602,710 A | 2/1997 | Schmidt et al. | |

FOREIGN PATENT DOCUMENTS

| CH | 659 550 A5 | 1/1987 |
| DE | 1 235 419 | 3/1967 |
| DE | 28 50 195 C2 | 5/1980 |
| DE | 3541 440 A1 | 5/1987 |
| DE | 44 08 818 C1 | 5/1995 |
| DE | 690 31604 T2 | 10/1997 |
| DE | 198 24 104 A1 | 10/1999 |
| EP | 0 388 779 A2 | 9/1990 |
| WO | WO 97/31417 | 8/1997 |

* cited by examiner

Primary Examiner—Gregory J. Toatley, Jr.
Assistant Examiner—Boris Benenson
(74) Attorney, Agent, or Firm—Burns, Doane, Swecker & Mathis, L.L.P.

(57) ABSTRACT

The bushing has an electrical conductor (1) to which high voltage can be applied. One section of the electrical conductor (1) is surrounded by a varistor arrangement (9). The bushing also contains two electrical connections (4, 6), one (6) of which can be connected to high voltage and the other (4) can be connected to ground, a bushing insulator (5) provided between the electrical conductor (1) and the varistor arrangement (9), and a clamping apparatus (11) which applies a contact force to the electrical connections (4, 6) and to the varistor arrangement (9) located in between them like a sandwich. The clamping apparatus has an insulating part which applies the contact force to the two electrical connections. The bushing insulator is in the form of a molding and has a supporting element, provided with a guide surface, for a contact (1a) (which is connected to the electrical conductor (1)) in a plug connection to a cable or to an apparatus bushing of an electrical apparatus.

16 Claims, 4 Drawing Sheets

HIGH VOLTAGE LEAD-THROUGH

TECHNICAL FIELD

The invention is based on a high-voltage bushing as claimed in the precharacterizing clause of patent claim 1.

PRIOR ART

In the precharacterizing clause of patent claim 1, the invention refers to a prior art as described in EP-A2-0 388 779. The already known bushing is in the form of a cable plug connection and has a varistor arrangement in the form of a tube, as well as an electrical conductor, which is guided along the tube axis and is provided with external insulation, in a high-voltage cable, a field-controlling insulating body arranged between the external insulation and the inner surface of the tube, and an external weather-resistant insulator surrounding the varistor arrangement. An electrical connection, which is connected to a metallic, grounded protective sheath of the cable, is electrically conductively connected via spring elements to the lower end of the varistor arrangement. The upper end of the varistor arrangement is electrically conductively connected to an electrical connection, which is connected to the electrical conductor and to a connecting conductor located outdoors. A threaded nut which is supported on the upper electrical connection is rotated to prestress the connecting conductor and the electrical conductor that is connected by a force fit to it, hence forming the contact force in the varistor arrangement as well as between the lower and upper end of the varistor arrangement and the two electrical connections.

This bushing is distinguished in that, in a confined space, it not only allows the cable electrical conductor to be securely passed out of the grounded cable sheath but also allows overvoltages, which can be brought about via the connecting conductor that is connected, for example, to an overhead line, to be limited.

Metal-oxide surge arresters, which are insulated by polymer plastics, for explosionproof operation and based on the design principles of composite insulators, layer composites and direct casting are specified in the publication by Walter Schmidt, Metalloxid—ein fast idealer Überspannungsableiter [Metal oxide—a virtually ideal surge arrester], Swiss Bulletin SEB/VSE July/1998, pages 13–20. Complete integration of the metal-oxide resistors in the polymer insulation structure improves the insulation level and the system reliability and reduces costs. Integration of the surge arresters with other electrical components, such as cable end terminations or bushings, for example for transformers, allows a further improvement in the protective function to be expected. No further details are given of the configuration of this integration.

CH 659 550 A5 specifies voltage-limiting conductive bushings with varistors as overvoltage limiters, in which a number of varistors in the form of annular disks, and preferably made of zinc oxide, are electrically connected in series, and the cylindrical electrical conductor is passed through their central opening. The mutually facing contact surfaces of the varistor disks can be separated by a thin, electrically conductive intermediate layer, for example composed of solder or diffusion welding agents.

It is known from the publication by Jeffry P. Mackevich and John W. Hoffmann, Insulation Enhancement with Heat-Shrinkable Components Part III: Shield Power Cable, IEEE Electrical Insulation Magazine, July/August 1991, Vol. 7, No. 4, pages 31–40, for electrical cables to be electrically shielded on their dielectric cable insulation layer with a specific electrical resistance of $10^4$ Ω·cm by means of a semiconductive layer, referred to as a semicon layer, which may be applied by extrusion or being wound on. Cable connections and end terminations are electrically insulated externally and are electrically shielded in places, in order to minimize field peaks and to ensure protection against direct contact.

DESCRIPTION OF THE INVENTION

The invention, as it is defined in the patent claims, is based on the object of further developing a bushing of the type mentioned initially, such that it can be tested, installed and maintained in a simple manner.

In the bushing according to the invention, a surge arrester which is integrated in the bushing is formed by using an insulating part to stress the two electrical connections and the varistor arrangement. The bushing can thus be produced without using any electrical conductor inserted in a cable or in an electrical apparatus, for example a transformer. Since, at the same time, a supporting element which is provided with a guide surface is formed in the bushing insulator, for a plug-in contact (which is connected to the electrical conductor) of a plug connection to a cable or to an electrical apparatus, the bushing insulator can be prefabricated completely and can be fitted at the installation location quickly and easily by plugging it to a housing bushing of an electrical apparatus, such as a transformer, or to a cable.

The guide surface is in the form of an external or internal cone, for connection to a conical end of an apparatus bushing or of a cable. For connection to a cylindrical end of an apparatus bushing or of a cable, for example a cable sleeve, the guide surface is in the form of an outer surface of a cylinder or an inner surface of a hollow cylinder. The interaction of the guide surface with a corresponding guide surface on the apparatus bushing or the cable allows a mechanically strong and dielectrically high-quality plug connection to be produced in a simple and reliable manner.

In one particularly advantageous embodiment of the invention, the electrical connection which can be connected to high voltage is arranged detachably, and can be replaced by an insulating test cap. When the bushing is being manufactured, the test cap composed of insulating material can then be installed first, instead of this electrical connection. This considerably reduces the voltage drop in the surge arrester. The bushing and the apparatus connected to it, or the system connected to it, can now be loaded with high-voltage test pulses, which would otherwise destroy the surge arrester.

In a further advantageous embodiment of the bushing according to the invention, an overcurrent protective device 20 is installed in a section of the electrical conductor surrounded by the varistor arrangement. Without occupying any significant additional amount of space, this bushing limits not only voltages but also currents at the same time.

Effective protection of the electrical conductor, or insulation of the electrical conductor, in the event of the varistor arrangement being overloaded is provided if the clamping apparatus is tubular, and is arranged between the electrical conductor and the varistor arrangement.

Particularly compact bushings with a good dielectric behavior are achieved if the varistor arrangement has hollow varistors with an internal profile matched to the shape of the electrical conductor, and/or with an oval or rectangular external profile, and/or if the varistor arrangement is hollow and axially symmetrical, and has a conical or bottle-shaped contour in the direction of the electrical conductor.

The varistors are expediently split in the direction of the electrical conductor, since the varistors in the varistor arrangement can then not only be produced particularly easily but, furthermore, this also ensures that the bushing can be installed and maintained particularly easily.

The dielectric behavior of the bushing can be additionally improved if the bushing insulator on the supporting body has a voltage-linearizing effect.

BRIEF DESCRIPTION OF THE DRAWINGS

The invention will be explained in the following text with reference to exemplary embodiments. In the figures.

APPROACHES TO IMPLEMENTATION OF THE INVENTION

In the figures, identical parts are identified by identical reference symbols.

Figure 1:
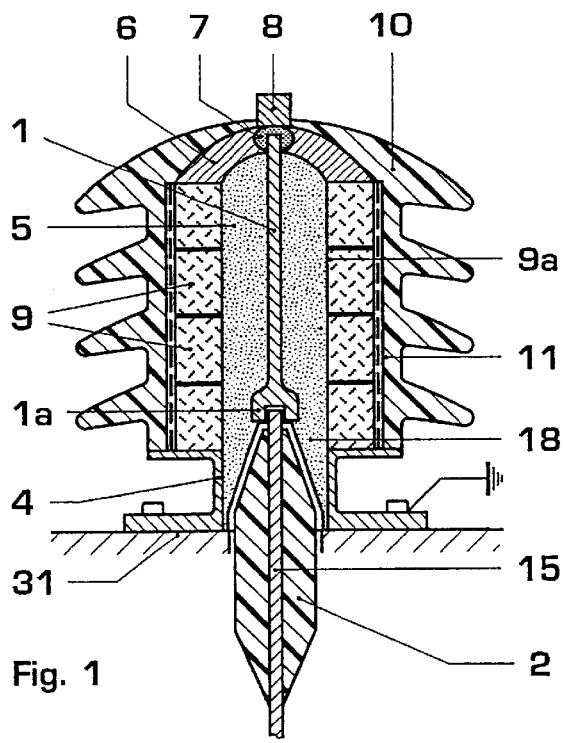
FIG. 1 shows, schematically, a longitudinal section through one embodiment of the bushing according to the invention, in conjunction with a transformer bushing.

FIG. 1 shows a longitudinal section through a bushing according to the invention, which is plugged onto a bushing which guides an electrical conductor 15 that is carrying high voltage through the grounded wall 31 of a transformer, by means of a bushing insulator 2. The bushing according to the invention has an electrical conductor 1 to which high voltage can be applied. Varistors in the form of annular disks in a varistor arrangement 9 are arranged concentrically around this electrical conductor, and are electrically connected in series with one another. At the end, the varistor arrangement 9 is electrically connected by means of a contact part, in the form of a disk, of an electrical connection 4 to the transformer housing 31 and, through an electrical connection 6 and via a connecting element 7, firstly to the electrical conductor 1 and secondly to an electrical conductor 8 located outdoors. The connecting element 7 may be a mechanical fixing, for example a screw connection or plug connection, or a soldered joint. The connecting electrical conductor 8 can be electrically connected, for example, to an overhead line. A clamping apparatus 11, which is indicated by dashed lines, is arranged outside the varistor arrangement 9 and has an insulating part, for example an insulating cylinder, or a number of tensioning strips in the form of loops, for applying stress to the varistors, which are located in sandwich form between the two electrical connections 4 and 6. This clamping device 11 and the electrical connection 6 are enclosed in an electrical insulator or outdoor insulator 10, which is resistant to outdoor conditions and is preferably composed of a silicone elastomer, ethylene propylene diene monomer (EPDM) or ethylene vinyl acetate (EVA) plastic, epoxy resin or polyurethane.

A bushing insulator 5 composed of a flexible, shapeable casting, pressing or kneading compound, in particular such as a polymer based on silicone, epoxy or polyurethane, or a fine-pore polymer foam, is located between the electrical conductor 1, the electrical connection 4 in the form of a disk, the varistor inner surfaces 9a and the electrical connection 6. The bushing insulator can also be split and can in each case be combined with a dielectrically high-quality gel, oil or gas. An internal cone 18 is formed at the lower end in the bushing insulator, and is used as a supporting element for a contact 1a, which is connected to the electrical conductor 1, of a plug connection to a mating plug-in contact (which is not shown) on the transformer bushing. The dielectric constant of the material of the insulator 5 is >1, preferably >2, and its thermal conductivity is <0.5 W/(m·K), preferably <0.3 W/(m·K). The bushing insulator 5 insulates the electrical conductor 1 from ground, and provides capacitive coupling between the electrical conductor 1 and the varistors which govern the electric field. It ensures that the varistor arrangement has a better dynamic response when surge voltages occur. To improve the linearization of the electric field further, a voltage-linearizing body, for example a winding body containing control electrodes or a voltage-linearizing insulating material, can be installed in the internal cone 18 of the bushing insulator 5. Instead of the internal cone, an external cone with an appropriate mating piece on the apparatus side can also be chosen.

Figure 2A:
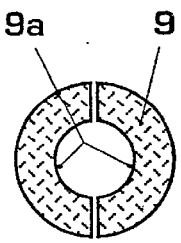
FIGS. 2a–2e show cross sections through varistors, such as those which can be used in the bushing shown in FIG. 1.
Figure 2B:
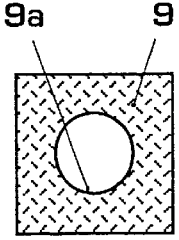
Figure 2C:
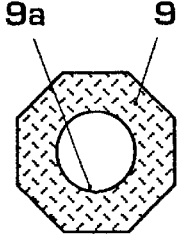
Figure 2D:
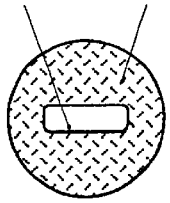
Figure 2E:
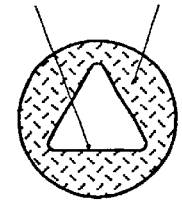

FIGS. 2a–2e show, schematically, cross sections through varistors of different shapes in the varistor arrangement 9. These varistors may, for example, be in the form of hollow cylinders with an annular cross section or components which are split once or more for installation at the side as shown in FIG. 2a, and with a cutout for accommodating an electrical conductor (cable) sheathed with insulating material or an uninsulated electrical conductor. The varistors may, for example, have oval (FIG. 2d) or triangular (FIG. 2e) cutouts and, externally, may, for example, be square (FIG. 2b) or octagonal (FIG. 2c); their cross sections may taper or widen conically or in the form of bottles with increasing depth, or else may be in the form of solid columns or disks, preferably arranged rotationally symmetrically with respect to the axis of the electrical conductor.

Figure 3:
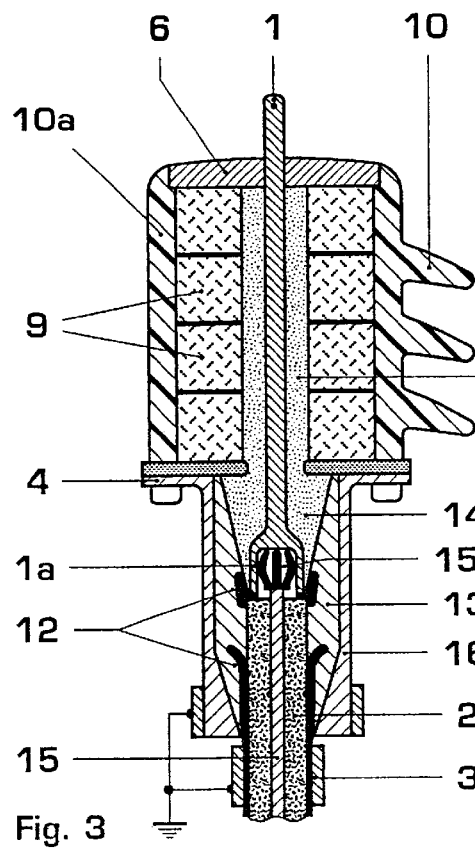
FIG. 3 shows, schematically, a longitudinal section through an embodiment of the bushing according to the invention which is in the form of a cable plug connection and has an external cone.

FIG. 3 shows a longitudinal section through a cable plug connection with an integrated varistor arrangement, having a bushing insulator 5 with an external cone 14 that tapers on the connection side. The material of the insulator 5 is a solid insulator, for example epoxy resin or silicone. This directly surrounds the electrical conductor 1, which projects out of the electrical connection 6 at one end, and is electrically connected to it; at the other end, it has a plug socket 1a, which makes an electrically highly conductive connection with a mating plug-in contact 15a at the end of an electrical conductor 15 of a cable with insulation 2, or with a semiconductor protective layer 3. For outdoor use, the varistor arrangement 9 is accommodated in an outdoor insulator 10, and when used indoors, it is accommodated in an indoor insulator 10a, without any shielding structure, see the configuration on the left-hand side.

The cable ends in a grounded housing or metal housing 16, from which it is electrically insulated by a cable insulating body 13 with a cone which widens on the connection side and is preferably composed of silicone. This cone matches the external cone 14. Field control electrodes 12 composed of a conductive or semiconductive material, preferably of silicone, are provided externally on the cable at the junction points to the housing input and to the external cone 14, and reduce the electrical field strength at these critical points. This metal housing 16 can be connected very easily to a completely assembled end part with the varistor arrangement 9.

The electrical connection 6 is arranged detachably and, after removal, can be replaced by an insulating test cap. When the bushing is being manufactured, the test cap, which is composed of an insulating material, can then be installed first of all instead of this electrical connection. This considerably reduces the voltage drop in the surge arrester. The bushing, and the apparatus connected to it or the system connected to it, can now be loaded with high-voltage test pulses, which would otherwise destroy the surge arrester.

Figure 4:
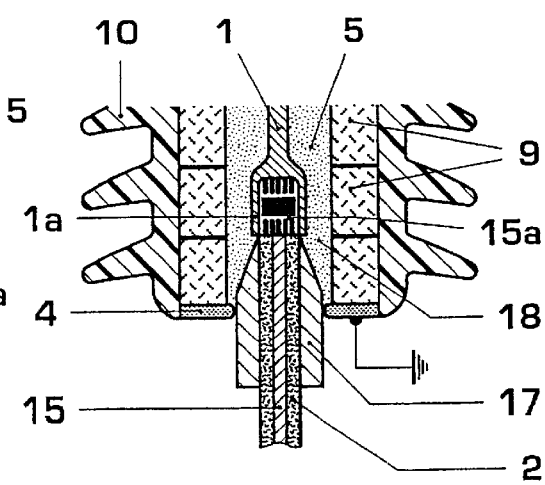
FIG. 4 shows, schematically, a longitudinal section through a part of an embodiment of the bushing according to the invention which is in the form of a cable plug connection and has an internal cone.

FIG. 4 shows, schematically, a longitudinal section through a detail of an end part which can be installed as a complete item, and which is similar to that shown in FIG. 3. Here, instead of the external cone 14 which tapers on the connection side, an internal cone 18 which widens on the connection side is formed in the bushing insulator 5. The plug connection formed by the contacts 1a and 15a is now located in the interior of the varistor arrangement. The cable, with its mating plug-in contact 15a at the end, is surrounded outside its cable insulation layer 2 by a cable insulation body 17 with an external cone which tapers on the connection side, is preferably composed of silicone, is designed to match the internal cone 18 of the insulator 5, and is directly connected to the cable when the latter is inserted. The dielectric material of the body 17 is arranged inside a grounded housing, which is not illustrated but which corresponds to that shown in FIG. 3. Field control electrodes 12 can also be provided in it.

Figure 5:
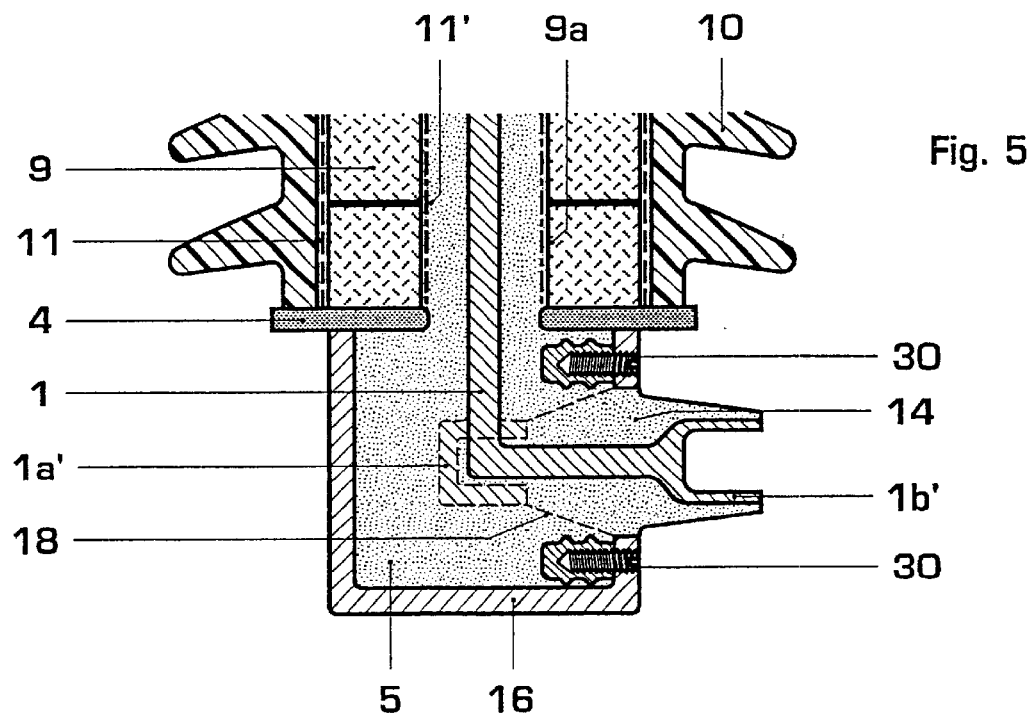
FIG. 5 shows, schematically, a longitudinal section through an embodiment of the bushing according to the invention which is in the form of an outdoor bushing and has an angled connecting part.

FIG. 5 shows, schematically, a longitudinal section through a detail of an outdoor bushing with an angled connecting part. A cylindrical angled plug socket 1a' can be provided in the region of the angle in the electrical conductor 1. An internal cone 18 can be formed in the bushing insulator 5—as indicated by dashed lines. Alternatively, an external cone 14 which tapers on the connection side can also be provided in the insulator 5. 1b' then denotes a plug socket at the end of the electrical conductor 1. A cable, which is not illustrated but can be inserted into the sockets 1a' or 1b', or a bushing can be mounted in a plug-in position by means of screws 30. Instead of the clamping device 11 outside the varistors in the varistor arrangement 9, a clamping device 11', preferably consisting of a glass-fiber-reinforced plastic tube or insulating tensioning strips, can also be provided inside the varistor inner surface 9a; this provides mechanical reinforcement and a thermal and mechanical protective barrier for the respective electrical conductor insulation 18, 14 if the varistor becomes hot or is overloaded. This alternative applies to all the varistor arrangements.

Figure 6:
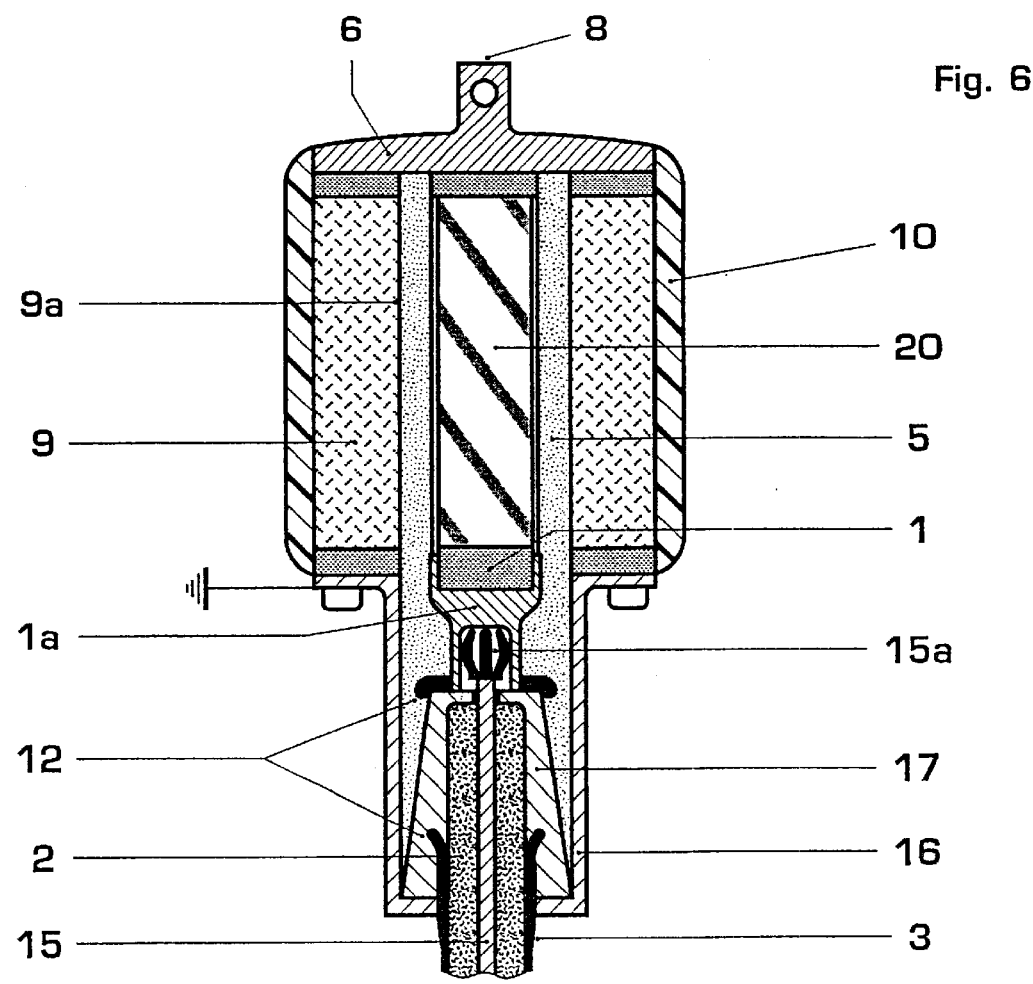
FIG. 6 shows, schematically, a longitudinal section through an embodiment of the bushing according to the invention which is in the form of a cable plug connection and has an overcurrent protective device.

An overcurrent protective device 20, for example based on known fuse links, can be installed in the varistor arrangement 9, see FIG. 6.

The bushing illustrated in FIG. 6 is similar to that shown in FIG. 4. Here, instead of the electrical conductor 1, the overcurrent protective device 20 is provided, and is electrically connected via the plug-in contact 1a to the plug-in contact 15a on the electrical conductor 15. The bushing insulator 5 can be designed such that it is subdivided (not shown), for example it can be composed of silicone on the plug side and of sand as the dielectric medium in the vicinity of the overcurrent protective device 20. The body of the overcurrent protective device 20 may also be surrounded by a porcelain or plastic housing, as in conventional protective devices. In this case, the gap between the overcurrent protective device 20 and the varistor arrangement 9 may be filled by a flexible dielectric material, as in the embodiment shown in FIG. 1.

Figure 7A:
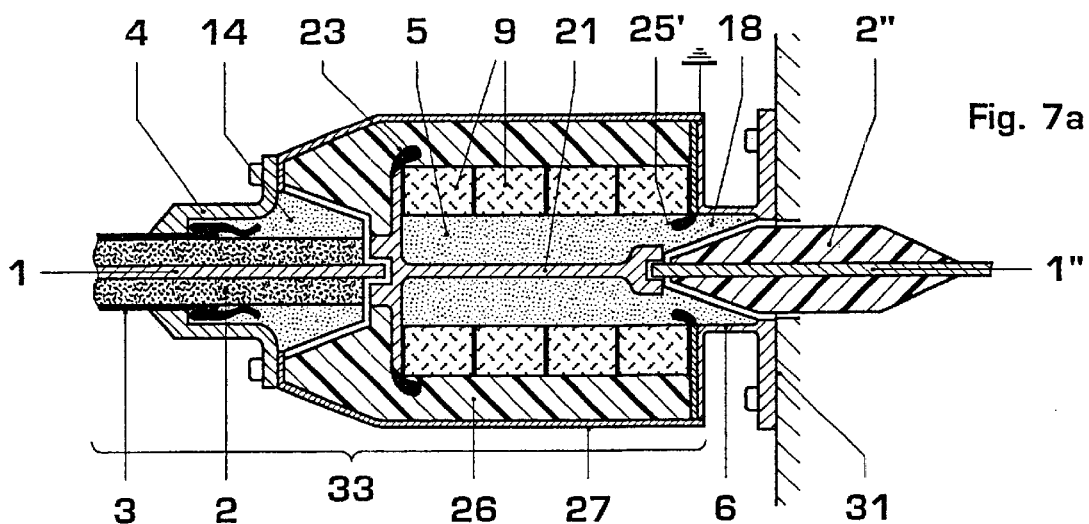
FIGS. 7a–7c show schematic longitudinal sections through respective embodiments, in the form of cable plug connections, of the bushing according to the invention in conjunction with a transformer bushing.
Figure 7B:
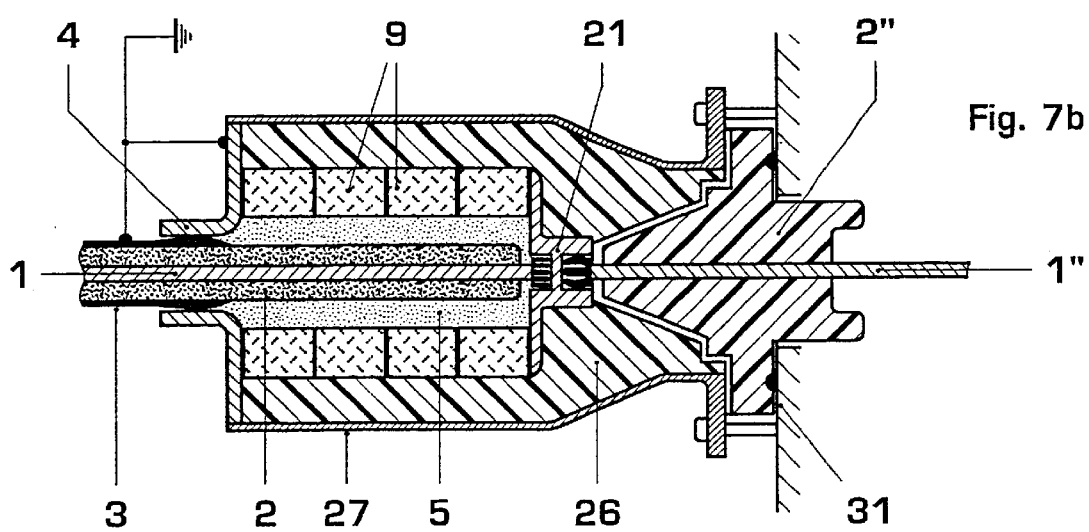
Figure 7C:
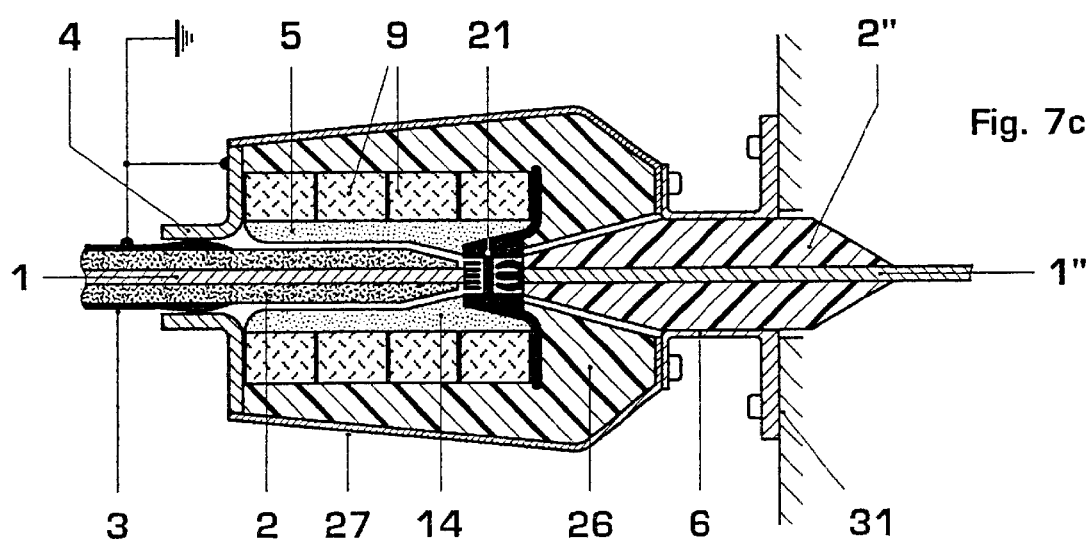

FIGS. 7a–7c show various versions of longitudinal sections through bushings which are each in the form of a cable plug connection 33, according to the invention, in conjunction with a respective housing bushing. The electrical conductor 1 of the cable is electrically connected via a plug connector 21 to an apparatus (for example a transformer) electrical conductor 1", which is surrounded in the region of a bushing opening of an electrically grounded apparatus (for example a transformer) housing wall 31 by an apparatus (for example a transformer) bushing insulator 2", and tapers on the connection side toward the cable plug connection 33, with an internal cone 18, which widens on the connection side, matching the dielectric medium.

In the embodiment shown in FIG. 7a, the housing bushing is designed in the same way on the connection side as the cable plug connection shown in FIG. 4, with a bushing insulator 5 having an internal cone 18 which widens on the connection side being provided between the insulator 2" and the varistors in the varistor arrangement 9. Field control electrodes 23 and 25' are used to reduce the local field strength.

In the embodiment shown in FIG. 7b, the left-hand cable plug connection is designed such that it cannot be used as a plug connection, while the design shown in FIG. 7c is similar to that shown in FIG. 4. Instead of an embodiment with an internal cone, it is also possible to provide an embodiment with an external cone, similar to that illustrated in FIGS. 3 and 6, or with an angled configuration, similar to that shown in FIG. 5 (not illustrated). The external cone may be in the form of a cylinder, for connection to a cable sleeve or a hollow-cylindrical apparatus bushing. For a cylindrical apparatus bushing, the internal cone may be in the form of a hollow cylinder.

Figure 8:
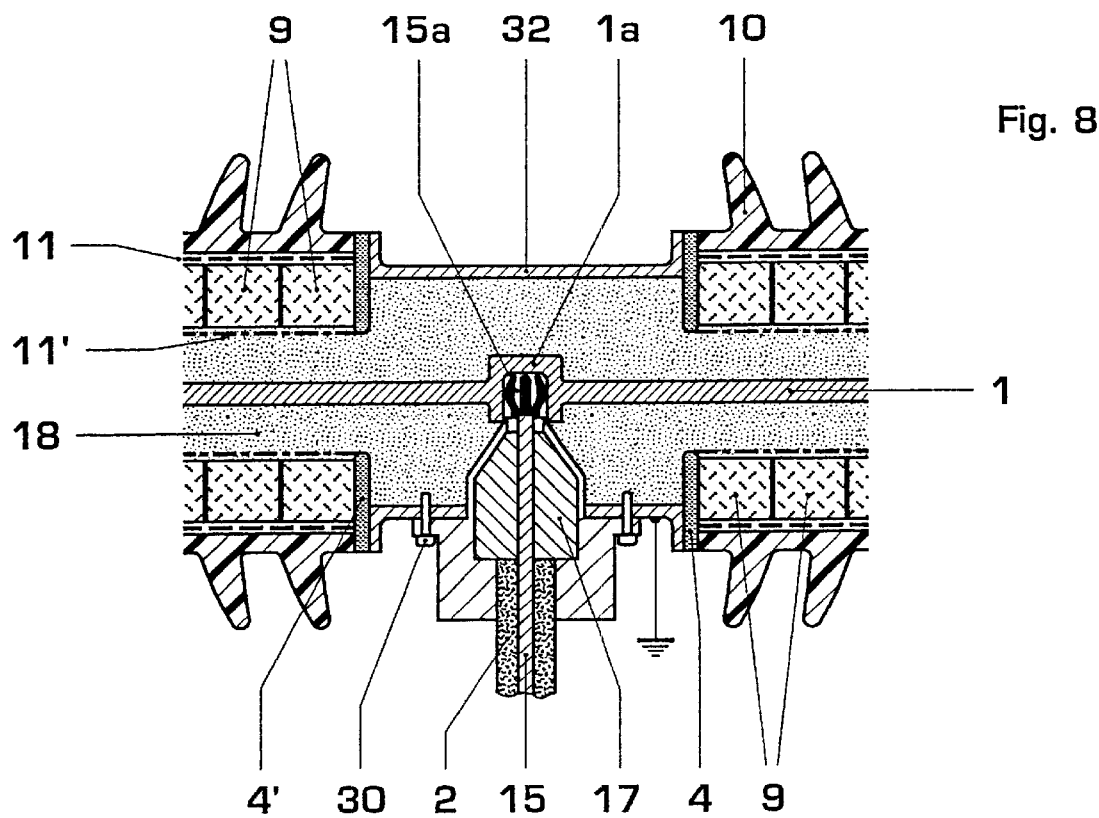
FIG. 8 shows, schematically, a longitudinal section through an embodiment of the bushing according to the invention in the form of a T-shaped cable plug connection.

FIG. 8 shows a longitudinal section through a detail of a T-shaped cable plug connection with integrated varistor arrangements 9 on both sides of the T-connection. In this case, electrical connections 4, 4' on the two varistor arrangements are electrically connected to one another by means of a grounded, metallic coupling piece or coupling tube 32. An electrical conductor 1, which is supported by the bushing insulator 5 by means of an internal cone 18 which widens on the connection side, has a cylindrical angled plug socket 1a in the region of the T-connection, into which the plug-in contact 15a of a cable is inserted. On the connection side, this cable has a cable insulating body 17 with a tapering cone, matching that of the dielectric medium with the internal cone 18 which widens on the connection side. This embodiment is particularly suitable for a pylon attachment with a cable outgoer. One side of the cable connection that passes through may also be designed with an outdoor insulator without a varistor arrangement (not illustrated), whose cost is less.

Figure 9:
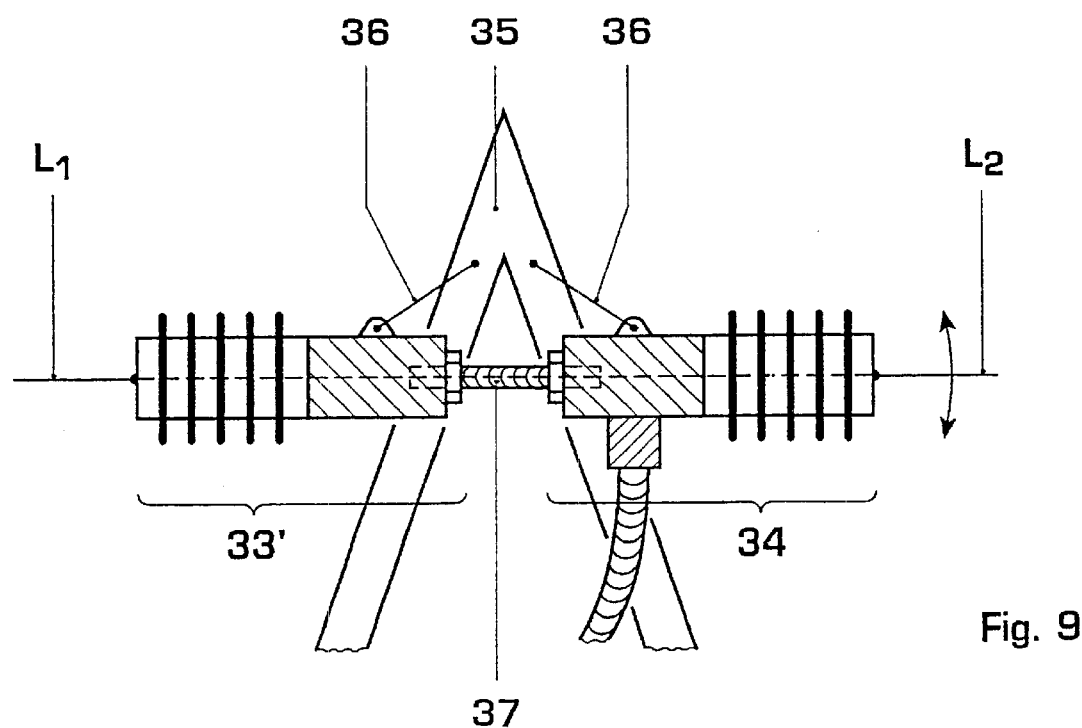
FIG. 9 shows, schematically, two bushings according to the invention, which are connected to one another by means of a flexible electrical conductor.

FIG. 9 shows, schematically, two cable end terminations 33', 34, which are attached to a pylon 35 via longitudinal supports 36, and which are mechanically decoupled by means of a flexible connecting piece 37. In this case, the cable plug connection 34 has an angled connection, similar to that shown in FIG. 8, but with a varistor arrangement on only one side. The flexible, insulated connecting piece 37, which is provided with a grounded shield, absorbs the movements of overhead lines (L1, L2) to the left and right of the pylon 35. The insulated cable 37 may be an electrical conductor 7 with a cable insulation layer 2 and a semiconductive protective layer 3; it may also be integrated in a positively locking manner in the metallic housing of the cable end terminations 33', 34.

LIST OF DESIGNATIONS

| | |
|---|---|
| 1, 1', 8 15, 15', 15" | Electrical conductor |
| 1a, 15a | Plug-in contacts |
| 2, 2' | Cable insulation |
| 2" | Transformer bushing insulator |
| 3 | Semiconductive layer |
| 4, 6 | Electrical connections |
| 5 | Bushing insulator |
| 7 | Connection element |
| 9 | Varistor arrangement |
| 9a | Varistor internal surface |
| 10, 10a, 10b | Insulators |
| 11, 11' | Clamping devices |
| 12, 23–25' | Field control electrodes |
| 13, 17 | Cable insulating body with cone |
| 14, 28 | External cone |
| 15a, 15a', 15b' 15a", 19 | Plug-in contacts |
| 16 | Housing |
| 18, 18' | Internal cone |
| 20 | Electrical protective device |
| 21 | Plug connector |
| 26 | Varistor external insulator |
| 27 | Electrical shield |
| 30 | Screws |
| 31 | Transformer housing wall |
| 32 | Coupling tube, coupling piece |
| 33, 33' | Cable plug connections without branches |
| 34 | Cable plug connection with angled connection |
| 35 | Pylon |
| 36 | Longitudinal support |
| 37 | Insulated, flexible cable |
| L1, L2 | Overhead lines |

What is claimed is:

1. A high-voltage bushing comprising:
    an electrical conductor to which high voltage can be applied;
    a varistor arrangement surrounding one section of the electrical conductor;
    two electrical connections, one for connection to high voltage and the other for connection to ground;
    a bushing insulator provided between the electrical conductor and the varistor arrangement, the bushing insulator being in the form of a molding and having a supporting element, provided with a guide surface, for a contact connected to the electrical conductor, in a plug connection to a cable or to a housing bushing of an electrical apparatus;
    an insulator housing for accommodating the varistor arrangement; and
    a clamping apparatus for applying a contact force to the electrical connections and to the varistor arrangement located in between them like a sandwich, the clamping apparatus having an insulating part configured using at least one of an insulating cylinder and a tensioning strip formed as a loop to apply the contact force to the two electrical connections independently from the insulator housing.

2. The bushing as claimed in claim 1, wherein the guide surface is in the form of an external cone or internal cone.

3. The bushing as claimed in claim 1, characterized in that the guide surface is in the form of an outer surface of a cylinder or an inner surface of a hollow cylinder.

4. The bushing as claimed in claim 1, wherein the electrical connection which can be connected to high voltage is arranged detachably, and can be replaced by an insulating test cap.

5. The bushing as claimed in claim 1, wherein an overcurrent protective device is installed in a section of the electrical conductor surrounded by the varistor arrangement.

6. The bushing as claimed in claim 1, wherein the clamping apparatus is tubular, and is arranged between the electrical conductor and the varistor arrangement.

7. The bushing as claimed in claim 1, wherein the varistor arrangement has hollow varistors with an internal profile matched to the shape of the electrical conductor, and/or with an oval or rectangular external profile.

8. The bushing as claimed in claim 7, wherein the varistors are split in the direction of the electrical conductor.

9. The bushing as claimed in claim 7, wherein the varistor arrangement is axially symmetrical, and has a conical or bottle-shaped contour in the direction of the electrical conductor.

10. The bushing as claimed in claim 1, wherein the bushing insulator on the supporting body has a voltage-linearizing effect.

11. The bushing as claimed in claim 4, wherein an overcurrent protective device is installed in a section of the electrical conductor surrounded by the varistor arrangement.

12. The bushing as claimed in claim 11, wherein the clamping apparatus is tubular, and is arranged between the electrical conductor and the varistor arrangement.

13. The bushing as claimed in claim 12, wherein the varistor arrangement has hollow varistors with an internal profile matched to the shape of the electrical conductor, and/or with an oval or rectangular external profile.

14. The bushing as claimed in claim 13, wherein the varistors are split in the direction of the electrical conductor.

15. The bushing as claimed in claim 14, wherein the varistor arrangement is axially symmetrical, and has a conical or bottle-shaped contour in the direction of the electrical conductor.

16. The bushing as claimed in claim 15, wherein the bushing insulator on the supporting body has a voltage-linearizing effect.

* * * * *